June 25, 1968  W. C. SWANSON  3,389,556
ORIFICE ADJUSTING MECHANISM
Filed July 5, 1966  3 Sheets-Sheet 3

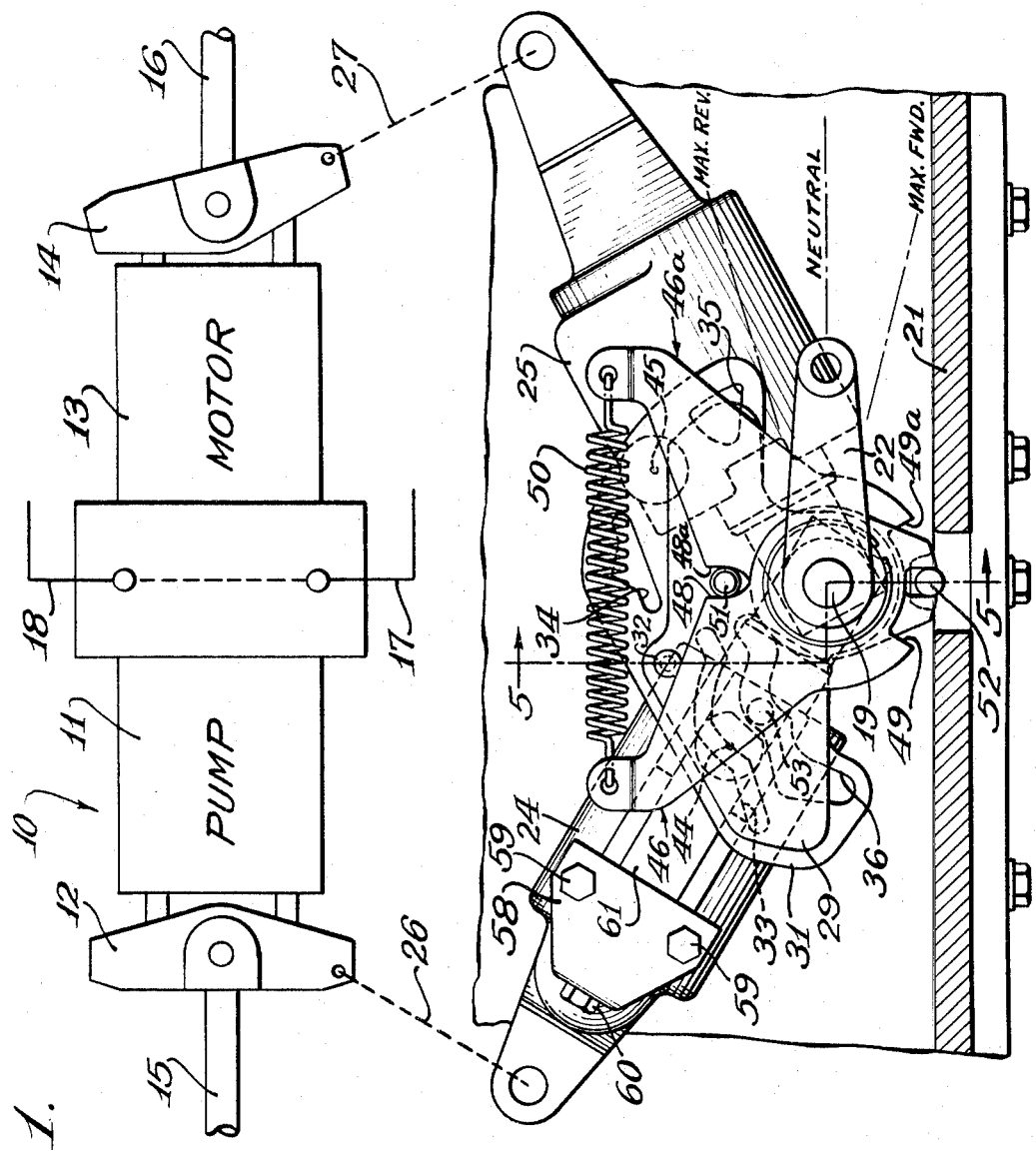

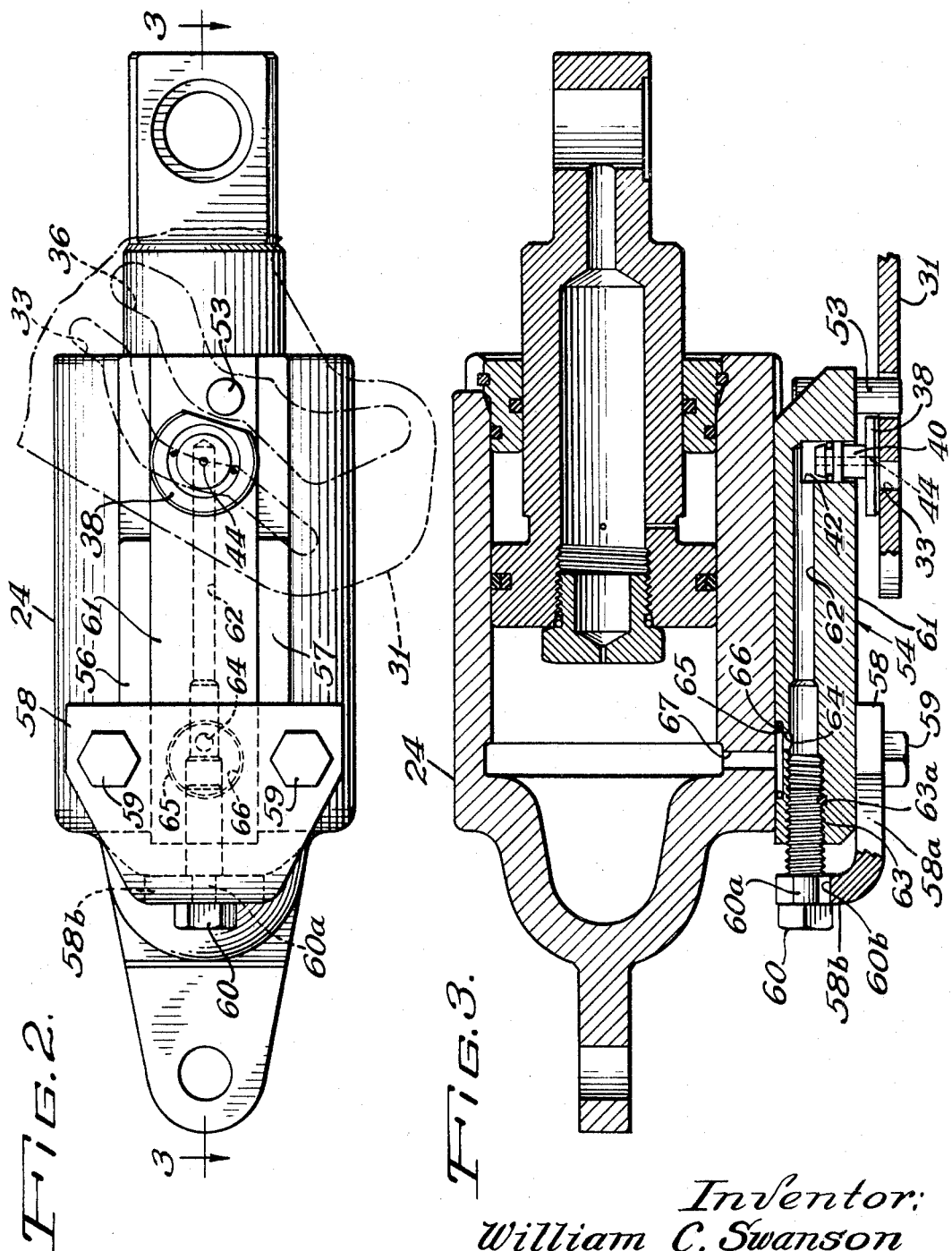

Inventor:
William C. Swanson
By Walter G. Gregory
Atty.

United States Patent Office 3,389,556
Patented June 25, 1968

3,389,556
ORIFICE ADJUSTING MECHANISM
William C. Swanson, Clarendon Hills, Ill., assignor to International Harvester Company, Chicago, Ill., a corporation of Delaware
Filed July 5, 1966, Ser. No. 562,888
10 Claims. (Cl. 60—53)

ABSTRACT OF THE DISCLOSURE

An orifice adjusting means for a servo cylinder to permit correlation between the neutral position for a hydrostatic transmission controlled by a cam plate with a valving slot and the swash plate position necessary for zero stroke, which means has a guide track on the servo cylinder, a manifold adapter slidably mounted in the track, passage means in the manifold adapter communicable with the working surfaces of the servo cylinder and the valving slot, bracket means carried by the servo cylinder and an adjustment bolt extending through the bracket means and threadedly engaging the adapter.

---

This invention relates to orifice adjusting and particularly to means for adjusting the outlet orifice of a hydraulic cylinder. More specifically however, it is directed to means for adjusting the location of the outlet orifice of a servo cylinder employed for controlling the rotative displacement of a swash plate in the pump component of a hydrostatic transmission unit.

In hydrostatic transmission units it has always been difficult because of the inherent characteristics thereof to condition such transmissions for neutral operation, and then maintain such neutral condition for indefinite periods. This, of course, is of particular significance when a transmission of this type is incorporated for propulsion purposes in a vehicle, such as a tractor or the like, because without a well defined or indexed neutral position the vehicle will creep thus necessitating the use of an anti-creep brake or some comparable vehicle holding means. Furthermore, unless such a transmission is maintained in neutral during periods of vehicle inactivity there will be excessive circulation with a resultant heating and frothing of the hydraulic fluid in the transmission, which, of course, as is well known is highly objectionable. Because of manufacturing tolerances it has always been extremely difficult to economically fabricate units of this type with sufficient precision and accuracy to assure that the swash plate of the pump component thereof would always be readily indexable into a suitable position without further initial adjustment to provide a zero stroke for said pump when the transmission was operatively shifted into the neutral position thereof. The present invention thus is concerned with providing novel means for circumventing this drawback in such transmission units.

It is a primary object, therefore, of the present invention to provide improved and simplified means for displaceably positioning the fluid outlet opening of a hydraulic servo cylinder device relative to a closure member cooperatively operative upon movement thereof for selectively controlling restriction of said opening.

Another object is to provide, in a hydraulic servo cylinder device operative for controlling displacement of the swash plate of a pump component in a hydrostatic transmission, means for adjustably displacing an outlet orifice of said servo relative to a cam closure member cooperative therewith so that in a neutral position of the transmission said orifice is disposed for partial restriction and as such is operative for maintaining the said swash plate positioned to provide zero stroke for said pump.

A further object is to provide, in a hydraulic servo cylinder device operative for controlling displacement of the swash plate of a pump in a hydrostatic transmission, means for adjustably displacing an outlet from said cylinder relative to a cam closure member operative for controllably restricting the flow of fluid therefrom including, a longitudinally extending cover block having a generally Z-shaped fluid passage therethrough, and adjustable means to permit slidable movement of the block relative to the cylinder so that the outlet of said Z-shaped passage is displaceable relative to the outlet opening from said cylinder whereby in a neutral position of the transmission the outlet from said passage is disposed for partial restriction by said cam closure member and as thus disposed is operative for controllably positioning the said swash plate to provide a zero stroke for said pump.

Further objects and advantages of the invention will become apparent as the following description proceeds, and the features of novelty which characterize the invention will be pointed out with particularity in the claims annexed to and forming a part of this specification. For a better understanding of the invention, reference may be had to the accompanying drawings in which:

FIGURE 1 is a partially schematic and elevational view showing the proposed invention adapted to a hydrostatic transmission;

FIGURE 2 is an elevational view of a hydraulic servo cylinder device to which the proposed invention has been applied;

FIGURE 3 is a horizontal sectional view of the servo cylinder shown in the preceding view and taken generally along the line 3—3 of FIGURE 2.

Figure 4:
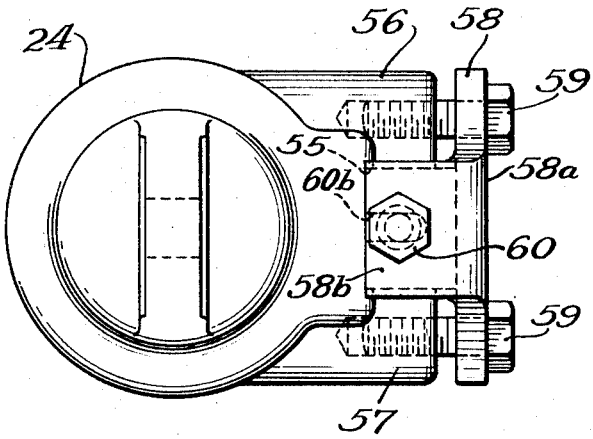
FIGURE 4 is an end elevational view of the servo device of the preceding views.

Reference being had now to FIGURE 1 of the drawings it will be seen that the proposed invention is shown, in one preferred form thereof, in association with the pump-motor unit of a hydrostatic transmission of the type frequently utilized for vehicular propulsion. The pump-motor unit, indicated generally by reference numeral 10, which may be generally conventional, includes a variable displacement reversible pump 11 having a pivotally mounted swash plate 12 rotatable in opposite directions from a centered neutral position for varying displacement of said pump, and a variable displacement reversible motor 13 having a pivotally mounted swash plate 14 rotatable for varying displacement of said motor, all as is well understood. Power input to the pump may be effected through a shaft such as 15 operably connected to a suitable power means (not shown), while the output of motor 13 may be operatively coupled by a shaft 16 to the component or device receiving said output, such for instance as the drive-wheels of a vehicle (not shown). Inlet and outlet fluid conduit connections 17, 18 communicatively connect said unit with a source of fluid pressure such as a conventional hydraulic system (not shown) in accordance with well-known practices. It will be understood suitable mounting and support means will be provided for the pump-motor unit but since the details thereof are not pertinent to the proposed invention no showing thereof is believed necessary herein.

A shaft 19 is suitably journaled by a bearing 20 carried in a fixed support 21 which may be constituted as a portion of the transmission housing of the vehicle when so employed, and an operating lever 22 mounted on the shaft and constrained for rotation therewith may be connected to suitable actuating means, such as a foot operated pedal or a manually operated handle, neither of which are shown. Coaxially aligned with shaft 19 is a mounting pin or stud shaft 23 suitably mounted on support 21, by means not shown, and adapted to anchor a pair of hydraulically actuated extendable and contractable servo cylinders 24, 25. The opposite ends of said cylinders are pivotally connected by suitable linkage, such as schematically represented at 26, 27 (FIGURE 1), to the respective pump and motor components 11, 13. Since mechanisms of the character referred to are well-known, as evidenced by the U.S. Patent No. 3,126,707 to M. M. Hann et al., further detailing of the construction thereof is believed unnecessary.

Mounted on shaft 19 and constrained for rotation therewith, by suitable means such as the interlocking key 28, is a back-up plate member 29, and a snap-ring 30 positioned in an annular recess in shaft 19 may be provided to limit axial displacement of said member therealong. A flat cam plate 31 having an opening therein and circumscribing shaft 19 is disposed in closely abutting relation with one face of said back-up plate member and fixedly secured thereto, by suitable fastening means such as the rivets or the like indicated at 32. The cam plate 31 may be shaped with an irregular outline, as generally indicated in the drawings, and provided with a plurality of valve porting slots 33, 34 and 35 and a guide pin slot 36. An exposed face 37 of cam plate 31 is adapted to slidably engage or contact a pair of button-like valve seat members 38, 39 having stem-like portions 40, 41 projecting normally therefrom and adapted to extend into fluid outlets 42, 43 communicating with respective servo cylinder devices 24, 25. Central longitudinally extending openings 44, 45 in said button members provide valving ports for communicating with the interiors of the respective cylinders. It will readily be seen that the button-like valve seat members 38 and 39 are disposed for cooperative positioning with the respective valve porting slots 33, 34, and 35 in cam plate 31. Thus in various rotated positions of the cam plate the slots therein are effective for varying the restriction to the outflow of fluid by covering or uncovering the valving port openings 44, 45 leading into the respective servo cylinders to thereby effect the extension or contraction thereof as desired to control the associated swash plates of the transmission. The cam plate 31 and its cooperative disposition relative to the valving port openings of the respective servo cylinders will be seen to be generally similar to the cam plate valve porting arrangement disclosed in the aforementioned Hann et al. Patent 3,126,707.

Figure 5:
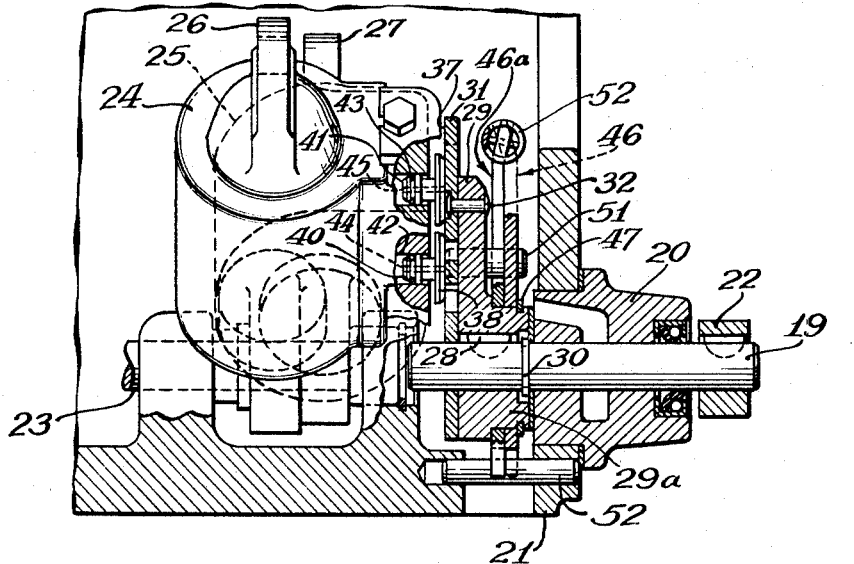
FIGURE 5 is a vertical sectional view taken generally along the line 5—5 of FIGURE 1 and having portions thereof shown in elevation.

A mechanism for centering the cam plate so that the transmission may be returned to and retained in neutral when the displacing actuating control force is removed therefrom may include a pair of scissor-like operating levers 46, 46a with central openings and rotatably positioned on a hub portion 29a, a back-up plate member 29, and disposed in abutting relation with the latter plate member and retained against axial displacement by suitable means such as the snap-ring 47 positioned in an annular recess in said hub portion (FIGURE 5).

The operating levers 46, 46a are fashioned with respective cut-outs or recesses 48, 48a having oppositely facing and substantially radially extending wall portions, and with shoulder abutments 49, 49a. A coil spring such as 50 has the opposite ends thereof bent over and anchored in openings in the respective ends of the operating levers and said spring is positionably anchored under tension so that said levers are constantly urged toward one another. A pin or stud 51 fixedly mounted in the cam plate assembly for movement therewith is disposed to extend axially into a space between the shoulder abutments 49, 49a of said levers thereby providing a displaceable stop or abutment member against which said levers are constantly urged by the action of spring 50 when the transmission is conditioned for neutral operation. In such case the cam plate will be positioned as indicated in FIGURE 1 and the relationship of the port openings 44, 45 relative to the respective cam plate slots will be so correlated as to maintain the associated swash plates in positions corresponding to the neutral position of the transmission. It will be seen by further reference to FIGURE 1 that in said neutral position the oppositely facing wall portions of the recesses 48, 48a are in contacting engagement with a pin 52 suitably mounted in the stationary support 21. It will readily be seen also, that rotation of cam plate 31 will always cause a selective corresponding rotation of one of the levers 46, 46a because as the cam rotates in one direction the pin 51 engages one of the shoulder abutments 49, 49a and in the opposite direction engages the other one of said abutments thus always carrying with it one or the other of said levers.

A follower pin 53 mounted for movement with pump servo cylinder 24 extends into the guide slot 36 and thus serves to further correlate movement of these components in a well-known manner.

The foregoing mechanism for centering the cam plate is disclosed and claimed in a copending U.S. patent application Ser. No. 562,611, filed on July 5, 1966 and further reference may be had thereto for additional details of the construction thereof.

Now in accordance with the more specific teachings of the invention proposed herein there is provided a means for adjustably displacing the valving port outlet of the pump servo relative to the cooperating valve porting slot of the cam plate so that in a neutral position of the transmission said outlet will be disposed for partial restriction by the respective valve porting slot to thereby maintain the associated pump swash plate positioned to provide zero stroke for said pump. To accomplish such objective the pump servo cylinder 24 has associated therewith an adapter outlet manifold or cover-like member, indicated generally by reference numeral 54, that is mounted for slidable movement relative to the port opening or orifice outlet of the associated servo cylinder.

A longitudinally extending recess 55 (FIGURE 4) fashioned in the exterior surface of servo cylinder 24 has an upper wall thereof contiguous with a lower wall surface of an upper boss-like projection 56 formed on the outer surface of said cylinder, while a lower wall of said recess is contiguous with an upper wall surface of a lower boss-like projection 57 likewise formed on said cylinder. As illustrated, these bosses are fashioned integral with the cylinder housing but it will be readily appreciated that they may be separately fashioned and suitably secured thereto without deviating from any teachings of the instant invention. As thus disposed the upper and lower wall surfaces of the bosses together with the recess 55 provides a guide track and support for slidably mounting the manifold adapter 54. A bracket 58, fashioned with an arm 58a having openings therein for slidably accommodating fastening means such as the cap screws or clamping bolts 59, 59 additionally receivable in threaded recesses in the respective boss members 56, 57, and another arm 58b disposed substantially at a right angle relative to the arm 58a and having an opening therein accommodating an adjusting bolt 60 additionally receivable in a threaded recess in one end of adapter 54, provides means for securely but adjustably positioning said adapter. The shank of bolt 60 has a reduced section portion 60a that is dimensioned for sliding through a slot 60b which opens into the opening in arm 58b to permit the positioning of the adjusting bolt therein in a rotatable but not axially displaceable position. Thus it will be seen that by tightening the bolts 59, 59 the adapter may be fixedly positioned at a location preselected by adjustment of the adjusting bolt 60, and by loosening bolts 59, 59 and adjusting bolt 60 the position of the adapter may be conveniently changed as required.

The adapter 54 may be fashioned as an elongated block member 61 generally square-shaped in cross-section and dimensioned to slidably fit recess 55 and to extend a short distance outwardly beyond the plane of the front wall surface of the bosses 56, 57 to permit said block to be tightly clamped in place by bracket 58. Fluid outlet opening 42 proximate one end of the block is adapted to slidably receive the stem 40 of valve seat member 38 and opens into one end of a longitudinally extending passage 62 the opposite end of which passage is threaded, as indicated at 63, to receive the adjusting bolt 60. Inwardly spaced from the threaded end of passage 62 is a transverse passage 64 that communicatively interconnects said longitudinal passage with a recessed opening 65 in the inner wall of said block. An O-ring sealing member 66 in the recessed opening 65 is provided to restrict leakage of fluid along the adjoining surfaces of block 61 and cylinder 24, while a nylon pellet 63a may be provided to prevent fluid leakage around the thread 63. An outlet port or orifice 67 opening into the interior of cylinder 24 is disposed to communicate with the recessed opening 65 in the adapter block.

Since the operation of many of the components of the herein described mechanism has been reviewed in detail in the aferementioned copending application and U.S. patent it is felt no further discussion thereof is required in the instant application in order that one skilled in the art might obtain a complete understanding thereof.

From the above it will be evident that the outflow of fluid from the associated servo cylinder is controlled by modifying the degree of restriction exercised by the associated valve porting slot of said cam plate in the various rotated positions thereof. Hence in order to attain a position of stability, or one where there is no movement of the servo cylinder because of fluid pressure, the outflow from the cylinder must be so regulated as to maintain a predetermined differential of pressure between portions therewithin. It will be appreciated therefore that when the valve porting slot of the cam plate is in a position corresponding to a neutral position of the transmission the restriction of the servo cylinder outlet must be such as to maintain the cylinder stabilized and immobile.

For one reason or another it is not always readily feasible to have the cam slot profile accurately aligned with the servo cylinder outlet and thus produce a condition of zero stroke for the pump when the cam plate is in its neutral position as delimited by its physical features including the position of stop pins 51, 52, 53, and the dimensions of recesses 48, 48a and abutments 49, 49a. Accordingly it becomes necessary to effect an adjustment of the relative positions of the servo valving port outlet and the associated valve porting cam slot and it will be seen that by slidably adjusting the position of the proposed adapter the location of the fluid outlet from the servo cylinder may be altered with respect to the cooperating cam slot whereby a null or zero stroke position of the pump essential for neutral operation is readily attained.

It should now be apparent that a novel means for adjustably displacing an orifice outlet of a hydraulic servo cylinder device has been shown and described, and it is to be understood that changes may be made in the construction without departing from the spirit of the invention or the scope thereof as defined in the appended claims.

What is claimed is:

1. In a hydraulic transmission, a variable displacement pump, a variable displacement motor, a first expandable and contractable fluid servo device operable for varying the displacement of the pump, a second expandable and contractable fluid servo device operable for varying the displacement of the motor, a valving port associated with each device so that when completely covered the associated servo device is expanded, when completely uncovered the servo device is contracted, and when partially covered the servo device is stabilized, pivoted cam plate means movable upon application of an external force thereupon in opposite directions from a neutral center position and having separate peripheral valving portions associated respectively with said valving ports, each valving portion being slidable relative to the associated valving port on pivotal movement of the cam to independently control pump displacement and motor displacement, means for adjustably displacing one of said valving ports relative to the asscciated valving portion of said cam plate means so that with the cam plate in a neutral center position the said one of said valving ports is partially covered by the associated valving portion of said cam plate and the associated servo device is stabilized.

2. The invention according to claim 1 but further characterized in that the said one of said valving ports that is adjustably displaceable is the valving port associated with the pump servo device, and the associated servo device that is stabilized when the cam plate is in a neutral center position is the servo device operable for varying displacement of the pump.

3. The invention according to claim 2 but further characterized in that the means for adjustably displacing the valving port includes an adapter member carrying the valving port and having a fluid passage in the member communicating the valving port with a fluid outlet of the associated servo device and with said member being slidably mounted on the respective servo device, and securing means adjustably fixing the position of said adapter relative to the servo device.

4. The invention according to claim 3 and further characterized in that the securing means adjustably fixing the position of the adapter includes a bracket disposed for clamping said adapter to the respective servo device with fastening means affixing said bracket to the servo device, and adjusting means operatively cooperative between said bracket and said adapter for slidably displacing said adapter.

5. The invention ccording to claim 4 but further characterized in that said bracket is L-shaped with one arm thereof disposed for positioning in clamping relation over said adapter and the other arm thereof being disposed in parallel spaced relation to one end of said adapter member.

6. The invention according to claim 5 but further characterized in that the said other arm of the bracket has rotatably mounted therein in an axially non-displaceable relation an adjusting bolt that is threaded into one end of said adapter and is rotatable for displacing said adapter selectively in opposite directions long a longitudinal axis thereof.

7. The invention according to claim 3 and further characterized in that the opening of the fluid passage of said adapter proximate the fluid outlet of the associated servo device is fashioned with an enlarged counter-bore whereby fluid communication is maintained between said fluid passage and said fluid outlet even with a substantial displacement of said adapter member away from a normal operting position thereof.

8. In combination, a hydraulic cylinder device expandable and contractable upon variation of a pressure differential between portions therewithin, said cylinder device having a valving port communicating with the interior thereof for release of fluid and the restriction of which controls the pressure differential between portions therewithin so that when completely covered the cylinder device is expanded, when completely uncovered the cylinder device is contracted, and when partially covered the cylinder device is stabilized, with pivotable valving port control means movable in opposite directions from a neutral center position and having a valving portion cooperative with said valving port and slidable relative to the latter port on pivotal movement of said means, and means adjustable for displacing said valving port relative to said valving port control means to provide a stabilized condition of the cylinder device when said control means is in a neutral center position thereof.

9. The invention according to claim 8 but further characterized in that the means for adjustably displacing the valving port includes a manifold member fashioned to provide fluid communication between said cylinder device and said valving port and slidably mounted relative to said cylinder device and said valving port control means, and combined clamping and adjusting means for tightly positioning said manifold member against said cylinder device at any one of a plurality of positions preselected by the adjusting means portion thereof.

10. The invention according to claim 9 and further characterized in that said cylinder device includes means fashioned to provide a guide track for the slidable receipt and support of said manifold member.

No references cited.

EDGAR W. GEOGHEGAN, *Primary Examiner.*